Figure 1:
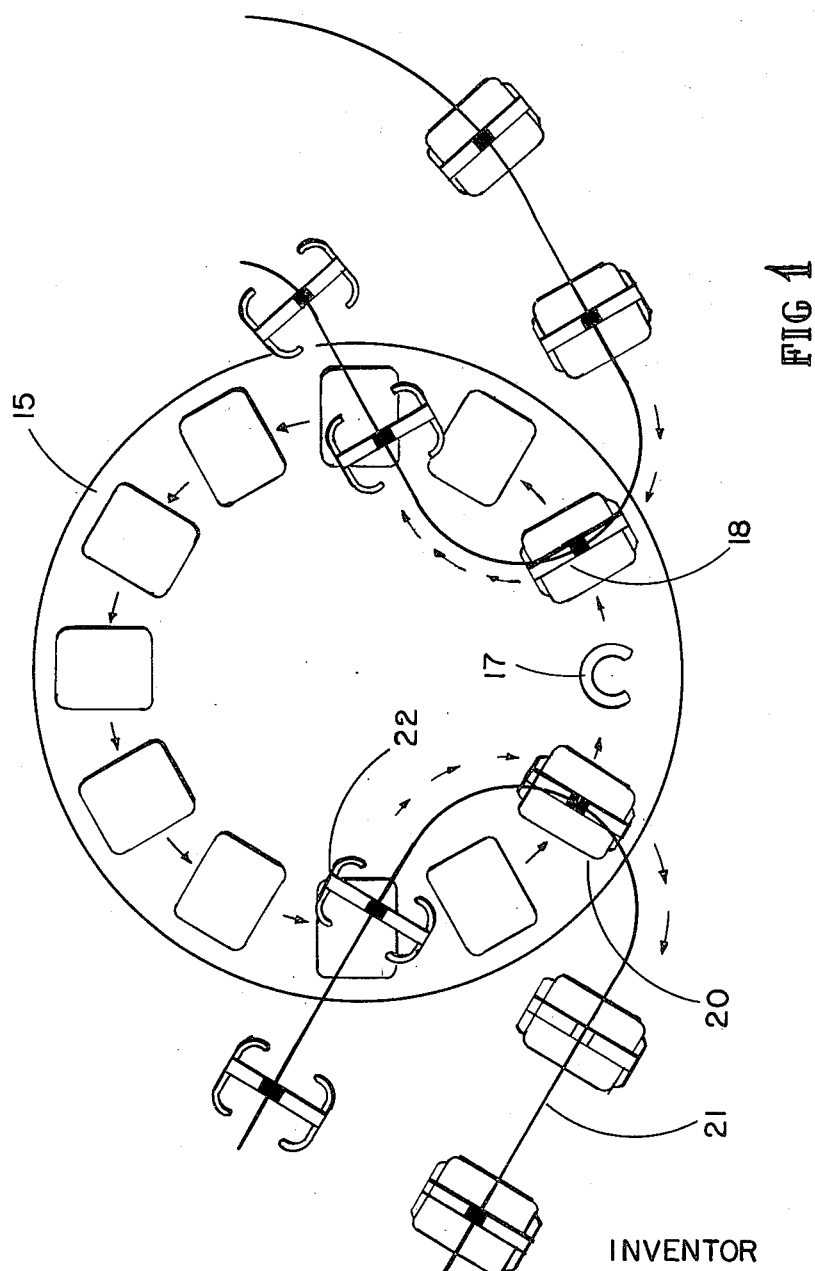

Nov. 20, 1956  J. CHRISTOFFERSON  2,771,174
CONVEYOR TRANSFER
Filed Feb. 16, 1953  2 Sheets-Sheet 1

INVENTOR
JAMES CHRISTOFFERSON
BY George W Crowley
ATTORNEY

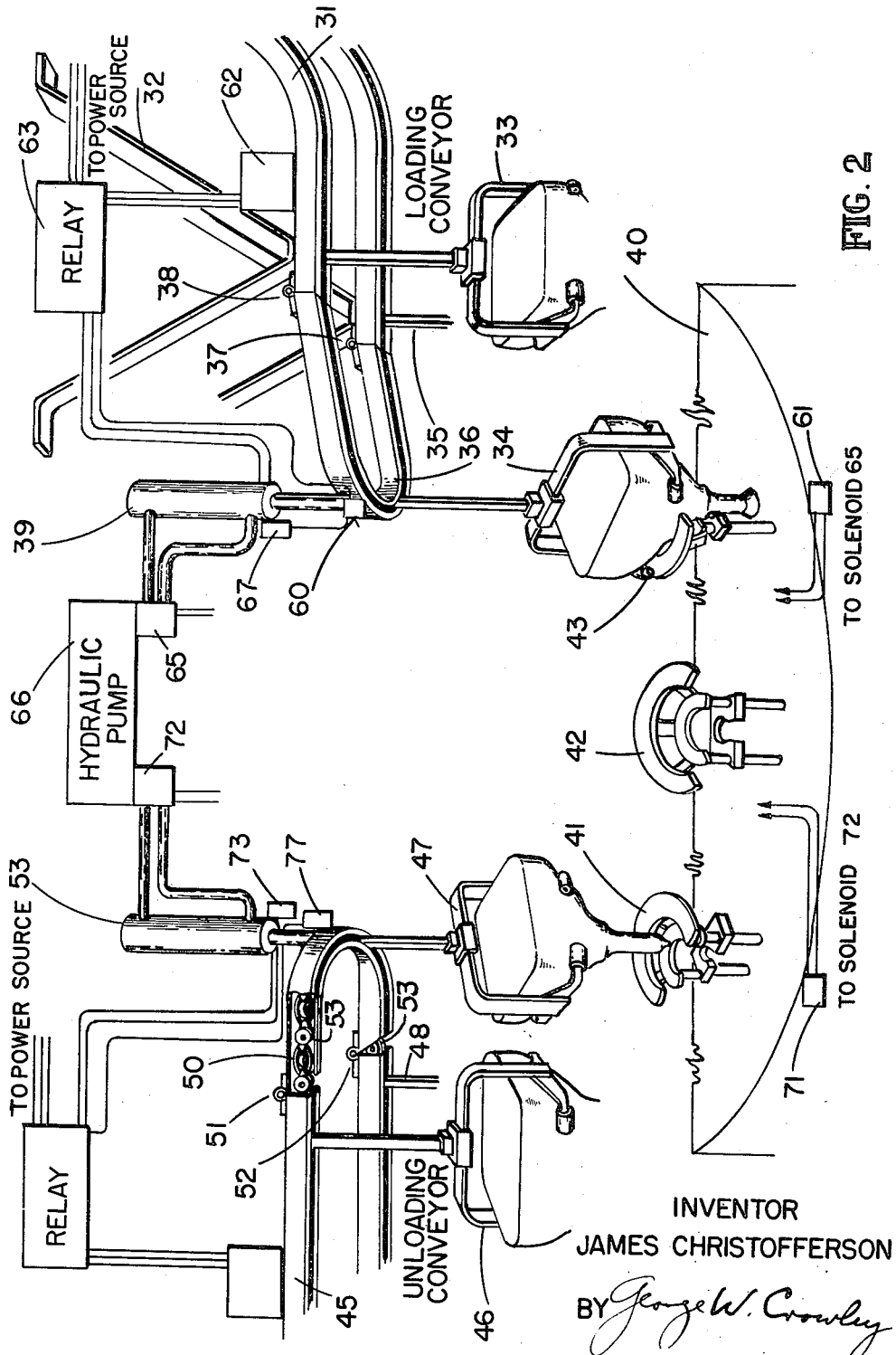

2,771,174
Patented Nov. 20, 1956

United States Patent Office

2,771,174
CONVEYOR TRANSFER

James Christofferson, West Newbury, Mass., assignor to Columbia Broadcasting System, Inc., Danvers, Mass., a corporation of New York Application February 16, 1953, Serial No. 337,046

4 Claims. (Cl. 198—21)

This invention relates in general to conveyor systems and in particular to conveyors of the overhead type.

Modern industry depends heavily upon conveyors to reduce or eliminate manual transporting of goods between manufacturing operations. In electronic manufacturing, mechanization of products has reached a fairly advanced state. This is particularly so in the case of picture tubes which are necessarily heavy and of a clumsy shape to be handled by and carried by a worker. The usual equipment of a picture tube manufacturing plant includes large numbers of conveyors, some of the overhead type and others of various kinds depending upon the operations being carried on. However, it is usually necessary for operators to attend the conveyors to load and unload them at the points where processing operations are required or where tubes are merely transferred from one conveyor to another. It is recognized that a solution to the conveyor loading and unloading problem would constitute a considerable advance toward the goal of a completely automatic factory.

Hence, it is an object of the present invention to provide a self loading and unloading conveyor.

It is a further object to mechanize further the processing of products.

It is a still further object to provide a simple, easily maintained conveyor transfer device.

In general, the present device consists in a conveyor of the endless chain type from which product transfer jigs depend. The track and frame within which the chain moves is articulated to permit the transfer jigs to pick up, lift, carry, lower, and deposit the product being transferred. For a better understanding of the invention, together with other and further objects, features, and advantages, reference should be made to the following description which is to be read in connection with the accompanying drawings in which:

Fig. 1 is a schematic view of embodiments of the invention as used in conjunction with a sealing machine; and Fig. 2 is a perspective view, partly cut away, of two of the conveyors of the invention and associated equipment.

Referring now to Fig. 1, there is shown a loading conveyor 12 which includes an overhead frame 13 through which an endless chain passes in the direction indicated. Saddles 14 are suspended from the chain at intervals and carry picture tubes along conveyor 12 to a sealing machine 15. Sealing machine 15 is of the turret indexing type and the path of travel of its heads is set to be perpendicular to the path of the chain of conveyor 12 at the top of the loop through which conveyor 12 passes. Each of the heads of sealing machine 15 carries a horseshoe-shaped chuck for receiving the necks of picture tubes. One of these chucks is indicated at 17, and it is locked in position such that the open side of the chuck faces away from the direction of travel of the endless chain of conveyor 12 when the chuck reaches the transfer position 18 beneath the conveyor 12.

Thus, when a tube supported in the saddle reaches point 18, its neck passes into the horseshoe-shaped chuck and is automatically locked therein. The tubes are then indexed into the various positions about the sealing machine 15 where sealing of the bulb to the mount is accomplished. At the unloading position at 20, the operation which took place at 18 is reversed. An unloading conveyor 21, having a chain travel in the direction indicated, is arranged so that the direction of travel of the chain is perpendicular to the direction of rotation of the turret of sealing machine 15. At the unloading position, the chucks have their open side facing in the direction of travel of the unloading conveyor. Thus, saddles as at 22 are able to remove the tubes from the chucks when the tubes arrive at the unloading position 20.

Referring now to Fig. 2, a perspective view of the loading and unloading conveyors as adapted to use with an indexing turret machine is illustrated. In this embodiment of the invention, a loading conveyor 31 consisting of a frame, open at the bottom, and an endless chain 53 travelling within that frame is used. The endless chain 53 may be any of numerous commercially available conveyor chains. Such chains are made up with flexible linkages between elements to permit bending in any direction for easy traversing of turns in the track on which they are mounted. The frame is supported from above by support member 32. Depending from the endless chain 53 at intervals are a number of saddles of which saddles 33, 34, and 35 are visible in this view. Conveyor 31 follows a semicircular path as shown at 36. The semicircular section of conveyor 31 is hinged at points 37 and 38. The hinged section is supported and operated by the shaft of a hydraulic cylinder 39. Beneath loading conveyor is the turret of an indexing machine 40. The turret of machine 40 is arranged to rotate such that the path of travel of each head intersects perpendicularly the path of travel of the endless chain 53 of conveyor 31 in the same manner as illustrated in Fig. 1. Horseshoe shaped chucks as at 41, 42, and 43 are provided one in each head of the turret and an unloading conveyor is also provided. It is similar in all respects to loading conveyor 31 and has similar saddles 46, 47, and 48 depending from its endless chain 53. A similar hinged semicircular section 50 is provided and is hinged at points 51 and 52. Also, a hydraulic cylinder 53 is provided with a shaft supporting section 50. A relatively simple switch circuit is provided to cause the automatic loading and unloading of machine 40 by conveyors 31 and 45. The components of this circuit will be identified hereinbelow in the explanation of the sequence of operations.

In operation, saddles are brought along loading conveyor 31 in the direction indicated by the arrow. Each of the saddles carries a picture tube as indicated in saddle 33. The hinged section 36 of conveyor 31 is assumed to be at an angle to the straight portion of the conveyor at the beginning of the operation. The turret of machine 40 indexes tripping a microswitch 61 which energizes 4-way solenoid valve 65 causing fluid to be pumped by hydraulic pump 66 to hydraulic cylinder 39 raising the hinged track section 50. When section 36 lifts, it trips a microswitch 67. Microswitch 67 connects power to the conveyor drive unit 62 by means of a relay 63 setting the loading conveyor chain in motion, and carrying empty saddle 34 away. The next saddle 33 moves on to hinged section 36 until its holder strikes and trips a microswitch 60 causing power to be shut off from drive unit 62 by relay 63, stopping the conveyor chain. Microswitch 60 also causes 5-way solenoid valve 65 to open. Hydraulic pump 66 then supplies fluid to hydraulic cylinder 39 which lowers horizontal section 36 causing the bulb in saddle 33 to be lowered into chuck 43, and the cycle is thus completed, to be repeated at the next index of turret of machine 40.

Simultaneously as the turret of machine 40 indexes unloading operations are being carried out by unloading conveyor 45. Here, the sequence of operation is as follows. As the turret completes an indexing movement, bringing saddle 47 under the cone of the tube in chuck 41, a microswitch 71 is triggered, opening 4-way solenoid valve 72, permitting fluid to flow from hydraulic pump 66 to hydraulic cylinder 53, which lifts hinged track section 50 causing saddle 47 to contact the cone of the tube and lift it free of chuck 41. At the top of the lift, the holder of saddle 47 trips a microswitch 73 which energizes a drive unit 74 through a relay 75 causing the chain of unloading conveyor 45 to resume motion bringing the next saddle 48 to a central point of hinged track section 50. Here, the holder of saddle 48 comes into contact with a microswitch 77 which deenergizes relay 75 disconnecting power from drive unit 74. The same microswitch 77 triggers 4-way solenoid valve 72 causing fluid from hydraulic pump 66 to be pumped to hydraulic cylinder 53 on the proper side to force the shaft of cylinder 53 down, lowering hinged track section 50. The next index of the turret of machine 40 brings another tube into position in saddle 48 and restarts the cycle as outlined above.

Although the invention has been explained in terms of its operation with an indexing turret sealing machine, it should not be so limited. Any type of machine, such as a bulb washer, exhaust machine, test rack, etc., could be substituted for the sealing machine. Also the articulated conveyors may be adapted to devices other than rotating turret machines. For example, bulbs being carried along a straight line conveyor may be similarly loaded or unloaded. In some few instances, it may be desirable to have nothing more than a simple transfer device when several conveyors are used and the only function of the device is to move materials from one conveyor to another. Then, it is necessary only to provide, as a minimum, a single chuck with timed movements of each conveyor, or a pair of chucks which may oscillate or rotate in any plane to carry the tubes from beneath one conveyor to a point below the other.

The invention should be limited only by the spirit and scope of the appended claims.

What is claimed is:

1. A self-loading conveyor for products comprising, a track, an endless movable chain carried on said track, a plurality of spaced saddles depending from said belt, said track being formed into at least one semicircular loop, hinges connecting the ends of said loop to said track, power means operative on said semicircular loop, and switching means for triggering said power means as one of said saddles reaches said loop, whereby said one of said saddles is lowered to pick up or deposit a product.

2. Apparatus as in claim 1 wherein said switching means comprises a switch mounted on said semicircular loop of said track, said switch being responsive to movement of one of said saddles along said semicircular loop.

3. Material handling apparatus comprising, first and second overhead conveyors, each of said conveyors including a track, an endless movable chain carried on said track, a plurality of spaced saddles depending from said chain, said track being formed into at least one semicircular loop, hinges connecting the ends of said loop to said track, a transfer device between and beneath said overhead conveyors, first power means operative on said loop of said first conveyor, first switch means for triggering said first power means in response to one of said saddles reaching said loop of said first conveyor, whereby said one of said saddles is lowered to deposit said materials on said transfer device, second power means operative on said loop of said second conveyor, second switch means for triggering said second power means in response to materials reaching a point on said transfer device beneath said second conveyor whereby one of said saddles is raised to pick up said materials from said transfer device.

4. Apparatus for handling picture tubes comprising, an overhead conveyor having a track, a normally stationary endless chain carried on said track, and first power means for moving said chain on said track, a plurality of saddles depending from said chain at spaced points, said saddles being formed of three sided brackets having inwardly directed projections on the fourth side for supporting said picture tubes by the conical portions thereof at two substantially diametrically opposed points, a portion of said track being formed into a semicircular loop, hinges connecting the ends of said semicircular loop to the remainder of said track, second power means for raising and lowering said loop, a transfer device disposed beneath the central area of said loop and having at least a chuck for receiving picture tubes, a first switch disposed for actuation by said transfer device for energizing said second power means to lift said loop to a position level with said remainder of said track, a second switch disposed for actuation by raising of said loop, said first power means being actuated by said second switch to impart motion to said endless chain, a third switch disposed on said loop for actuation by the holder of one of said saddles, said third switch being connected to break the circuit of said first power means and discontinue motion of said endless chain and also being connected to said second power means to lower said loop, causing a bulb in said saddle to be lowered into said chuck, further movement of said transfer device moving said chuck and tube out of said saddle.

References Cited in the file of this patent

UNITED STATES PATENTS

| 1,454,675 | Gantvoort | May 8, 1923 |
| 1,459,524 | Wright | June 19, 1923 |
| 1,580,745 | McBride | Apr. 13, 1926 |
| 1,753,560 | Emmert | Apr. 8, 1930 |
| 2,285,558 | Bisset | June 9, 1942 |
| 2,337,581 | Wiley | Dec. 28, 1943 |
| 2,612,981 | Alden | Oct. 7, 1952 |